United States Patent
Sohl

(10) Patent No.: US 6,338,706 B1
(45) Date of Patent: Jan. 15, 2002

(54) ROLL, AND PROCESS FOR PRODUCING A ROLL

(75) Inventor: Carsten Sohl, Fredericia (DK)

(73) Assignee: Voith Sulzer Papiertechnik Patent GmbH, Heidenheim (DE)

( * ) Notice: Subject to any disclaimer, the term of this patent is extended or adjusted under 35 U.S.C. 154(b) by 0 days.

(21) Appl. No.: 09/538,903

(22) Filed: Mar. 30, 2000

(30) Foreign Application Priority Data

Mar. 31, 1999 (DE) .......................................... 199 14 709

(51) Int. Cl.$^7$ .................................................. B25F 5/02
(52) U.S. Cl. ........................................... 492/56; 492/53
(58) Field of Search ............................... 492/50, 52, 53, 492/56, 59

(56) References Cited

U.S. PATENT DOCUMENTS

| | | | |
|---|---|---|---|
| 3,490,119 A | | 1/1970 | Fukuyama et al. |
| 5,387,172 A | * | 2/1995 | Habenicht et al. ............ 492/50 |
| 5,776,043 A | * | 7/1998 | Kato et al. ..................... 492/56 |
| 5,784,961 A | * | 7/1998 | Lorig et al. ............... 29/895.23 |
| 5,790,926 A | * | 8/1998 | Mizoe et al. .................. 492/50 |
| 5,797,322 A | * | 8/1998 | Lorig et al. .................... 492/56 |
| 5,836,860 A | * | 11/1998 | Watanabe et al. ............. 492/56 |
| 5,868,839 A | * | 2/1999 | Kato et al. ..................... 492/56 |
| 6,021,296 A | * | 2/2000 | Tamura et al. ............... 399/277 |
| 6,030,328 A | * | 2/2000 | Watanabe et al. ............. 492/56 |
| 6,202,557 B1 | * | 3/2001 | Kustermann ................ 101/376 |

FOREIGN PATENT DOCUMENTS

| | | |
|---|---|---|
| DE | 4312827 | 5/1994 |
| DE | 19736575 | 3/1999 |

* cited by examiner

Primary Examiner—Iguda Rosenbaum
(74) Attorney, Agent, or Firm—Greenblum & Bernstein, P.L.C.

(57) ABSTRACT

A process for producing a resilient roll having a hard roll core (e.g., of metal) and a resilient covering layer. In forming the covering layer, a radially inner connecting layer is applied to the roll core and a radially outer functional layer is applied to the connecting layer. In addition, in forming the connecting layer, a fiber bundle comprising a large number of fibers is wound onto the roll core, the winding direction of the fibers running essentially parallel to one another and at an angle to the circumferential direction of the roll core. A number of layers are wound one above another, with the angular position (i.e., orientation), as defined by the winding direction with respect to the longitudinal axis of the roll, of fiber bundles in respectively successive fiber layers being different. A roll according to the present invention comprises fiber layers each including a plurality of fibers wound at an angle to the longitudinal axis of the roll core and running essentially parallel to one another. For different fiber layers, the angular orientation of the fibers with respect to the longitudinal axis of the roll core is different.

20 Claims, 2 Drawing Sheets

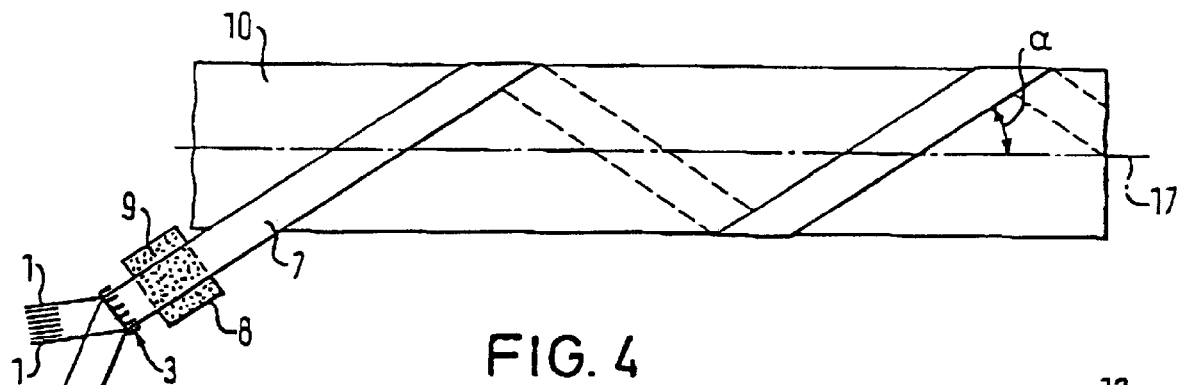
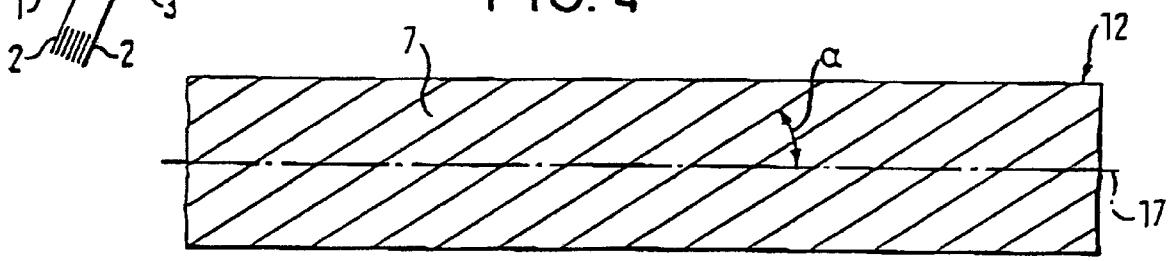
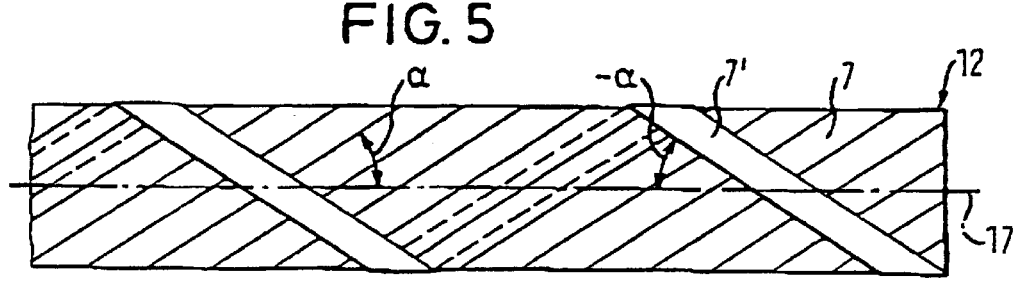
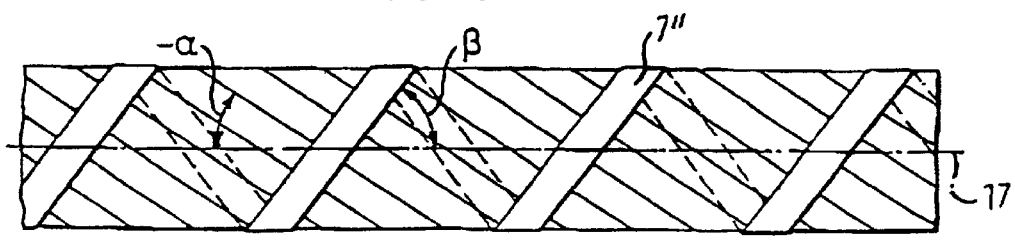

ROLL, AND PROCESS FOR PRODUCING A ROLL

CROSS-REFERENCE TO RELATED APPLICATION

The present application claims priority under 35 U.S.C. § 119 of German Patent Application No. 199 14 709.4, filed on Mar. 31, 1999, the disclosure of which is expressly incorporated by reference herein in its entirety.

BACKGROUND OF THE INVENTION

1. Field of the Invention

The present invention relates to a process for producing a resilient roll having a hard roll core. In particular, the roll core can be of metal and is provided with a resilient covering layer. In order to form the covering layer, an inner connecting layer is applied to the roll core and an outer functional layer is applied to the connecting layer. Further, in order to form the connecting layer, a fiber bundle including a large number of fibers is wound onto the roll core, the winding direction of the fibers running essentially parallel to one another and at an angle to the circumferential direction of the roll core.

Furthermore, the present invention is directed towards a roll, in particular for smoothing paper webs, having a hard roll core, which can be of metal, and which is provided, on its outer side, with a resilient covering layer. The resilient covering layer comprises an outer functional layer and an inner connecting layer for connecting the functional layer to the roll core. The inner connecting layer comprises a matrix material with fiber layers which are embedded therein and which are positioned radially one above another.

2. Discussion of Background Information

Resilient rolls of this type are used, for example, in the calendering of paper webs. An elastic roll and a hard roll form a press nip, through which the paper web to be processed is directed. While the hard roll has a very smooth surface, consisting, for example, of steel or hard cast iron and is responsible for smoothing that side of the paper web which faces it, the resilient roll acting on the opposite side of the paper web serves to compact and make uniform the thickness of the paper web in the press nip. The resilience of this second (i.e., resilient) roll therefore prevents a too intensive compacting of the paper web, which would lead to a specky appearance of the paper web. The rolls are on the order of from about 6 to 12 m long and of from about 800 to 1500 mm in diameter. The rolls withstand line forces of up to approximately 600 N/mm and compressive stresses of up to approximately 50 N/mm².

Since the trend in paper manufacture is for calendering to be carried out on-line, (i.e., the paper web leaving the papermaking machine or coating machine is immediately led through the paper smoothing device or calendering device), higher requirements than previously are placed on the rolls of the smoothing device, particularly with respect to their temperature resistance. The high transport speeds of the paper web, necessitated by on-line operation, and the associated high rotational speeds of the calender rolls, increase their alternating flexure frequency, which in turn leads to increased roll temperatures. These high temperatures, produced in on-line operation, lead to problems which, in the case of known resilient rolls, can lead to the destruction of the synthetic covering of the roll. On one hand, in the case of known synthetic coverings, maximum temperature differences of about 20° C. over the width of the roll are permissible and, on the other hand, the polymers normally used for the coating have a significantly higher coefficient of thermal expansion than the steel rolls or hard cast iron rolls normally used for the core roll. Accordingly, as a result of an increase in the temperature, high axial stresses occur between the steel or hard cast iron core roll and the synthetic coating connected to it.

As a result of these high stresses, associated with heated locations occurring at certain points or regions within the synthetic coating, so-called hot spots can occur, as a result of which the separation or even the bursting of the synthetic layer takes place.

These hot spots tend to occur in particular when, in addition to the mechanical stresses and the relatively high temperatures, there are crystallization points in the form of, for example, faulty adhesive bonds, deposits or above average bulges in the resilient covering. Such bulges can occur, for example, as a result of creases or foreign objects on the paper web. In such cases, the temperature at these crystallization points can rise from a normal of about 80° C. to 90° C. to more than 150° C., which results in the aforementioned deterioration of the synthetic layer.

SUMMARY OF THE INVENTION

The present invention relates to a process for producing a resilient roll having a hard roll core and a resilient covering layer. The roll is formed by applying a radially inner connecting layer to the roll core and applying a radially outer functional layer onto the connecting layer. The connecting layer is formed by winding a fiber bundle comprising a plurality of fibers onto the roll core. The winding direction of the fibers is substantially parallel to one another and at an angle to the circumferential direction of the roll core. Thus, a plurality of fiber layers are wound over one another and the angular orientation of successive fiber layers with respect to the longitudinal axis of the roll core is different.

Further, the fiber bundle of two immediately successive fiber layers are wound in opposite directions such that angular orientations of the two immediately successive fiber layers are symmetrical with respect to the cross-sectional area of the roll. The angle with respect to the longitudinal axis of the roll of the fiber bundles for the individual fiber layers increases radially outwards from the center of the roll. The angle, with respect to the longitudinal axis of the roll of inner layers of fiber bundles is about 30° to 40°. Further, the angle, with respect to the longitudinal axis of the roll, of successive fiber layers increases in steps of about 10° to 200°.

According to a further feature of the present invention, the fiber bundles are formed by fiber rovings, a roving comprising a plurality of fibers of identical type positioned beside one another. Further, the fibers are at least one of glass fibers and carbon fibers. In forming at least one of the connecting layer and the functional layer, glass fibers and carbon fibers are wound simultaneously onto the roll core.

Further, during the winding, a large number of glass fiber and carbon fiber rovings positioned to about one another are simultaneously wound onto the roll core to form a roving layer. Before being wound onto the roll core, the glass fibers and carbon fibers are surrounded with a matrix material.

The hard roll core can be comprises a metal roll core.

Further, the angle, with respect to the longitudinal axis of the roll, of successive fiber layers can increase in steps of about 15°.

In addition, in forming at least one of the connecting layer and the functional layer, glass fibers and carbon fibers are wound simultaneously onto the roll core. Further, the matrix material comprises a resin/hardener combination.

The glass fibers and carbon fibers are drawn through a resin/hardener bath. The glass fibers and the carbon fibers can be simultaneously wound dry onto the roll core and have a matrix material applied to them after the winding operation. In addition, the glass fibers and the carbon fibers can be completely embedded in the matrix material.

The matrix material can be a polymer which can be one of a thermosetting polymer and a thermoplastic polymer.

The mixture ratio of glass fibers to carbon fibers can be between about 60/40 and about 90/10. Further, the mixture ratio of glass fibers to carbon fibers is about 70/30.

The fiber content of the connecting layer c(an be between 50 and 60% by volume. Further, the fiber content of the connecting layer can be about 55% by volume. In addition, the fiber content of the functional layer can be between about 8 and 12% by volume.

Further, the fiber content of the connecting layer can be between about 40 and 70% by volume. In addition, the fiber content of the functional layer can be between about 5 and 20% by volume.

The present invention also relates to a roll, adapted for use in smoothing paper webs, which has a hard roll core and a resilient covering layer. The covering layer can be an outer functional layer and an inner connecting layer that connects the functional layer to the roll core. The inner connecting layer includes matrix material with embedded fiber layers, the fiber layers being positioned radially one over the another. The fiber layers each comprise fibers wound at a predetermined angle to the longitudinal axis of the roll core and extending essentially parallel to one another. For different fiber layers, the predetermined angle of the fiber layers with respect to the longitudinal axis of the roll core is different.

The predetermined angle of the fiber layer increases as distance from the roll core increases. Further, the matrix material can be a polymer. Further, the matrix material comprises a resin/hardener combination.

The fiber bundles of two immediately successive fiber layers extend in opposite directions such that orientations of the fiber bundles of two immediately successive fiber layers are symmetrical with respect to the cross-sectional area of the roll.

The predetermined angle, with respect to the longitudinal axis of the roll of the individual fiber layers increases radially outwardly. Further, the predetermined angle in the inner fiber layers is between about 30° and 40°. In addition, the predetermined angle can increase in steps of about 10° to 20°.

According to a further feature, the fiber bundles comprise fiber rovings, a roving comprising a number of fibers of identical type lying beside one another. The fibers are at least one of glass and carbon fibers. At least one of the inner connecting layer and the outer functional layer is made up of a mixture of glass fibers and carbon fibers, which are embedded in a matrix material and are distributed essentially uniformly over the length of the roll.

BRIEF DESCRIPTION OF THE DRAWINGS

The present invention is further described in the detailed description which follows, in reference to the noted plurality of drawings by way of non-limiting examples of certain embodiments of the present invention, in which like numerals represent like elements throughout the several views of the drawings, and wherein:

FIGS. 3, 4, 5, and 6 show various intermediate states of a roll constructed according to the invention during its production.

DETAILED DESCRIPTION OF THE PREFERRED EMBODIMENTS

Figure 1:
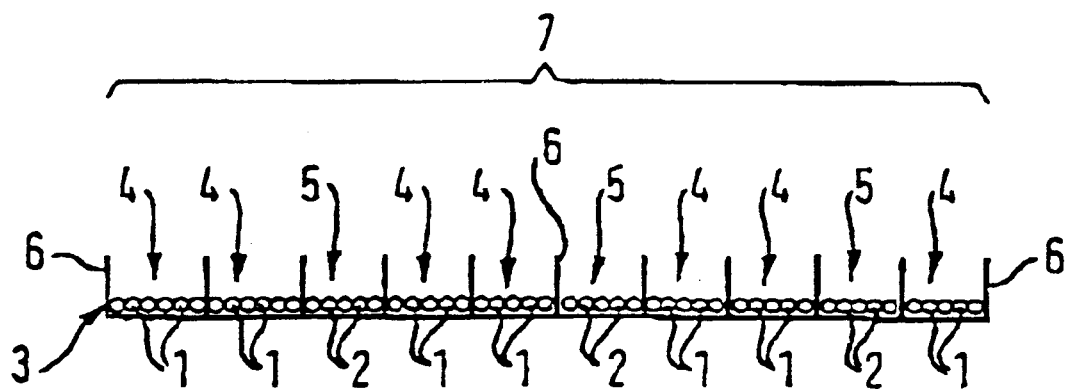
FIG. 1 shows a schematic cross-sectional illustration of a device for separating fibers into rovings.

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied in practice.

It is an object of the present invention to specify, define and provide a process for producing a resilient roll and a corresponding roll, in which the risk of occurrence of hots spots is reduced, with at least contact mechanical characteristics.

To accomplish this object (relating to the process) according to the present invention, a number of fiber layers are wound over one another, and the angular position, as defined by the winding direction with respect to the longitudinal axis of the roll, of fiber bundles of successive fiber layers is different. According to the present invention, a roll includes fiber layers, each of which include fibers wound at an angle to the longitudinal axis of the roll core and running essentially parallel to one another. Further, for different fiber layers, the angle of the fibers with respect to the longitudinal axis of the roll core is different.

In a roll which is produced or constructed according to the present invention, the connecting layer is constructed such that it form an optimal, mechanical, stress-optimized connection between the (metal) roll core and the outer functional layer. This ensures that the connection between the (metal) roll core and the functional layer (i.e., the contact surface between connecting layer and functional layer) is at no point subjected to an excessively high longitudinal stress, so that the risk of detachment or separation of functional layer and connecting layer, and therefore the formation of hot spots, is reduced.

As a result of the different angular positions (i.e., orientations) of the fibers, a different thermal expansion behavior in the longitudinal direction of the roll is achieved for each of the wound fiber layers, depending on the fiber alignment (angle). This makes it possible to provide a connecting layer whose resulting coefficient of thermal expansion changes in the radial direction arid, in particular, increase in the radial direction. During the winding of the inner fiber layers, the angular positions of the fibers are chosen such that the inner regions of the embedded fibers have a coefficient of thermal expansion which approximately corresponds to that of the roll core. On the other hand, the angular positions of the fibers are chosen such that the radially outer regions of the connecting layer have a coefficient of thermal expansion which essentially corresponds to that of the functional layer.

Since the resilient matrix material is present between the individual fiber layers, the connecting layer has an adequate resilience in the longitudinal direction of the roll, the stresses occurring as a result of differences in the expansion of the metal roll and the functional layer can be absorbed by the connecting layer.

Therefore, in the radial direction, the connecting layer has a quasi-continuously varying coefficient of thermal expansion, so that at the contact surfaces between the connecting layer and the roll core and/or between connecting layer and functional layer, substantially stress-free situations occurs even in the event of heating.

According to a preferred embodiment of the present invention, the fiber bundles of two immediately successive (i.e., adjacent) fiber layers are wound at identical angles but in opposite directions. In other words, the angular positions of the fiber bundles of two immediately successive (i.e., adjacent) fiber layers are symmetrical with respect to the cross-sectional area of the roll. In this way, the resulting connecting layer has a symmetrical construction, which results in uniform loading of the covering layer during operation and thus, to a prolongation of the service life of the roll.

According to a further advantageous feature and embodiment of the present invention, the angular position (i.e., orientation) of the fiber bundles for the individual fiber layers increases with distance from the center of the roll. The increase in the angular position yields the result that the inner regions of the connecting layer have a relatively low coefficient of thermal expansion, similar to that of the roll core, while the coefficient of thermal expansion of the outer regions of the connecting layer is considerably higher, and substantially corresponds to the coefficient of thermal expansion of the functional layer. According to a preferred feature of the present invention, the angular positions of two successive fiber layers are equal in terms of magnitude and differ only in direction, while the angular positions of the adjoining next two fiber layers have a higher magnitude than that of the prior (i.e., inner), but again have the same magnitude as one another and differ only in direction. In this way, the angular positions (i.e., orientations) of every two fiber layers increase in the radially outward direction.

Typical values for the angular position of the inner fiber layers are about 30° to 40°, with the angular position increasing in steps of about 10° to 20°, preferably in steps of about 15°.

According to an advantageous embodiment of the present invention, the fiber bundles are formed by fiber rovings, a roving being made up of a large number of fibers of identical type positioned beside one another. In this case, in order to form the connecting layer, glass fibers and carbon fibers can preferably be wound simultaneously onto the roll core. In particular, a mixture ratio of glass fibers to carbon fibers of between about 60/40 to about 90/10 can be used. Further, a ratio of about 70/30, is advantageous.

As a result of the simultaneous application or mixing of glass fibers and carbon fibers in the ratio specified according to the present invention, their characteristics are optimally combined with one another. While the glass fibers have a coefficient thermal expansion which is relatively close to that of steel, they have a relatively poor thermal conductivity. On the other hand, the thermal conductivity of the carbon fibers is very high. At the same time, the carbon fibers have a stiffness which is about three times as high as the glass fibers.

As a result of the glass and carbon fibers being applied in the mixture ratio specified according to the present invention, in addition to providing an increase in the stiffness of the connecting layer, an improvement in the thermal conductivity within the connecting layer is also achieved. The improvement in the thermal conductivity is particularly provided by the carbon fibers, by which the heat produced at points within the connecting layer can be dissipated in the axial direction via the carbon fibers, before such intensive overheating occurs that a hot spot is produced.

In principle, the fibers can be wound on the roll core either using the wet winding process and the dry winding process. In the wet winding process, the fibers, before being wound onto the roll core, are drawn through a soft matrix material provided in liquid form, and are thus completely surrounded by the matrix material. On the other hand, in the dry winding process, the essentially dry fibers are wound onto the roll core and have a soft matrix material applied to them only during or after the winding operation, to become completely embedded in the matrix material.

The matrix material used in normally a polymer, in particular a resin/hardener combination. The matrix material can consist of a thermosetting polymer or a thermoplastic polymer. In this regard, the term "soft" as used in connection with the matrix material is to be understood a meaning "soft" only in relation to the outer surface of the roll core, which can in particular be a steel roll, which is referred to as hard.

As a result of the virtually complete embedding of the fibers in the matrix material, the connecting layer is provided with the necessary resilience. Further, the matrix material also serves as a connecting material between the outer functional layer and the roll core. In principle, however, it is also possible for there to be an additional contact layer, for example an adhesive layer, between the periphery of the metal roll core and the connecting layer.

According to a further advantageous embodiment of the invention, the fiber content of the connecting layer is about 40 to 70% by volume. In particular the fiber content can be about 50 to 60% by volume, and preferably is about 55% by volume. The fiber content according to the present invention ensures that the optimum mechanical and thermal characteristics of the connecting layer previously set forth are maintained.

In contrast to the connecting layer, the fiber content of the functional layer is preferably about 5 to 20% by volume. In particular, the fiber content can be about 8 to 12% by volume. As a result of the reduced fiber content, the functional layer has a lower stiffness than the connecting layer, which is necessary for evening and compacting the paper web to be treated during calendering. If, because of the reduced fiber content, the coefficient of thermal expansion of the functional layer becomes too high, this coefficient can be reduced by an appropriate addition of fillers to the matrix material of the functional layer.

FIG. 1 shows a large number of a plurality of glass fibers 1 and carbon fibers 2, illustrated in cross section, which are combined by a comb-like or rake-like collecting unit 3 in each case (i.e., for each of the glass fibers 1 and carbon fibers 2) to form single-layer fiber bundles, which are known as rovings, 4, 5.

In each case a glass fiber roving 4 or a carbon fiber roving 5 is separated from the next adjacent roving 4,5 by a tooth 6 of the collecting unit 3, so that a unique mixture ratio of glass fibers within the roving tape 7 formed by the glass fiber and carbon fiber rovings 4,5 and a predefined distribution of glass fibers 1 and carbon fibers 2 along the width of the roving tape 7 are ensured.

The mixture ratio between about the glass and carbon fibers 1,2 is about 70/30. Each roving 4,5 can include, for example, about 10,000 to 14,000 individual fibers 1, 2 each having a thickness between about 0.1 and 0.3 mm. In the present case, the roving tape 7 comprises ten rovings 4, 5, but in principle and within the scope of the present invention, the roving tape 7 can also comprise more or fewer rovings, for example 8 to 16 rovings.

In FIG. 1 the rovings 4, 5 are illustrated as ideally formed as a single layer of fibers. However, in practice a roving consists of a large number of fiber layers, of which each individual fiber has a diameter from about 8 to 12 $\mu$m and a roving has a thickness of about 0.1 to 0.3 mm, for example about 0.2 mm. The essential factor is that the width of a roving 4, 5 is significantly greater with respect to its thickness, so that it acts as a substantially single-layer construction.

Figure 2:
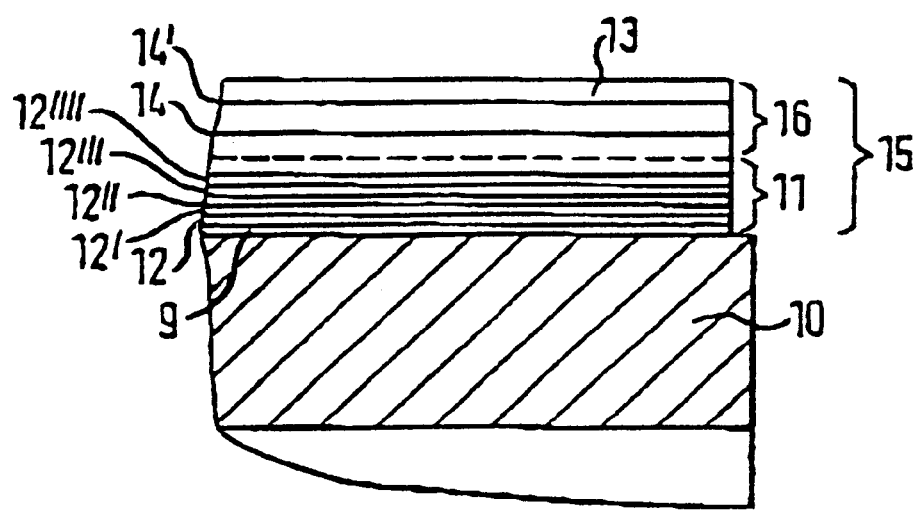
FIG. 2 shows a partial longitudinal section through a roll constructed according to the invention.

FIG. 2 illustrates part of a roll core, to which a covering layer 15 has been applied. The covering layer 15 comprises an inner connecting layer 11 and a functional layer 16 adjoining the latter radially on the outside (i.e., positioned radially outwardly of the connecting layer). The connecting layer and the functional layer 16 each comprise a resilient matrix materials 9, 13 in which, in each case, roving layers 12, 12', 12", 12''', 12'''', 14, 14' are embedded. In this case, the spacing of the roving layers 12–12'''' within the connecting layer 11 is considerably smaller, and as a result their number is considerably higher, than the spacing of the roving layers 14, 14' of the functional layer 16. The increased fiber proportion within the connecting layer 11 has the effect of providing a considerable improvement in the thermal conductivity within this layer, while the reduced fiber component within the functional layer ensures the necessary resilience.

FIG. 3 illustrates how the glass fibers 1 and the carbon fibers 2 are directed over the collecting unit 3 and combined into the roving tape 7, after which they are led through an impregnation device 8, shown schematically. In the impregnation device 8, the individual rovings 4, 5 are coated with a liquid matrix material 9, so that the rovings 4, 5 are essentially completely embedded in the matrix material 9. The matrix material can be, according to the present invention, a polymer. In particular, a resin/hardener combination can be utilized.

The roving tape 7, surrounded completely with the matrix material 9 by the impregnation device 8, is wound onto the roll core 10 so that it forms an angle α with respect to the longitudinal axis 17 of the roll core. The winding procedure is carried out over the entire length of the roll core 10. Upon reaching the end of the roll core 10 which is not illustrated, the roving tape is directed over a winding core and directed back in the opposite direction. In being wound in the opposite direction, the roving tape is preferably directed in such a manner that it butts up against the previously wound roving tape 7.

This winding procedure is repeated until the roving tape 7 has been wound completely around the roll core 10, so that the result produced by the roving tape 7 and the matrix material 9 covering the roving tape 7 is a self-contained first roving layer 12, whose fibers all form essentially the same angle a with respect to the longitudinal axis of the roll core 10, as illustrated in FIG. 4.

In the next coating step, an additional (i.e., second) roving tape 7' is wound onto the first roving layer 12. The roving tape 7' is wound onto the roll core 10 at an angle −α (as shown in FIG. 5) with respect to the longitudinal axis 17, until the first roving layer 12 is completely covered by the additional layer of roving tape 7'.

After the application of the two lowest symmetrical roving tape layers 12, in the next process step another roving layer 7" is wound onto the second roving layer, as shown in FIG. 6. The roving tape 7" forms an angle β with respect to the longitudinal axis 17 which is greater than the angle α. The roving tape 7 " is thus wound more steeply than the roving tape 7. As a result, the alignment of the fibers 1, 2 of the roving tape 7 " extends more closely to the circumferential direction of the roll core 10, while the alignment of the fibers 1,2 of the roving tapes 7, 7' runs more closely to the axial direction of the roll core 10. As a result of these different fiber alignments, the connecting layer 11 produced by the roving layers 7, 7', 7 " and the matrix material 9 has different mechanical and thermal characteristics in the radial direction. In particular, these layers have different coefficients of thermal expansion. By choosing the appropriate angular orientations of the successive roving layers during the winding procedure, the coefficient of thermal expansion of the connecting layer 11 can be adjusted and controlled such that, in the region of contact with the roll core 10, it is of the order of magnitude of the coefficient of thermal expansion of the roll core, while at its outermost surface in the region contact with the outer functional layer 16, it is of the order of magnitude of the coefficient of expansion of the functional layer 16.

The winding procedure can be repeated several times with different angular orientations, until a connecting layer 11 with a thickness of, for example, about 3 to 10 mm has been produced. The functional layer 16 can be constructed in a similar way to the connecting layer 11. However, the fiber content in the covering layer 16 is considerably lower than in the connecting layer 11. In particular the fiber content can be, for example, about 8 to 12% by volume. In principle, it is also possible, in the functional layer 16, to change the angular position (i.e., orientation) of the fibers during windings, so that it is possible, for example, in the radially inner region of the functional layer 16, to match the coefficient of thermal expansion of the functional layer 16 to the coefficient of thermal expansion of the outermost region of the connecting layer.

In this way, and by the above-described construction, the axial stresses between the connecting layer 11 and the functional layer 16 which occurs in the event of heating can be further reduced.

The glass fibers 1 and carbon fibers 2 embedded in the matrix material 9 of the connecting layer 11 enable the coefficient of thermal expansion of the connecting layer 11 to have a value which approaches the coefficient of thermal expansion of the roll core 10, which, for example, can be made of steel. In the event of a temperature increase during operation, a longitudinal expansion of the roll core 10 occurring in the axial direction is therefore accompanied by a corresponding expansion of the connection layer 11, so that longitudinal stresses occurring between the roll core 10 and the connecting layer 11 in the axial direction are minimized. Although the functional layer 16, whose coefficient of thermal expansion is predominantly determined by the matrix material 13 (i.e., by the resin/hardener mixture), expands considerably more in the axial direction, in the event of corresponding heating, the longitudinal stresses produced because of the connection between the functional layer 16, the connecting layer 11 and the roll core 10 are largely absorbed by the resilience of the connecting layer 11.

In addition, the carbon fibers contained in the roving layers 12 and 14 result in a very good axial thermal conductivity of the connecting layer 11 and/or the functional layer 16. Thus, heat from any overheating points which may arise within the connecting layer 11 can be dissipated rapidly in the axial direction. Accordingly the temperature within the connecting layer 11 and the functional layer 16 remains reliably below a critical limiting temperature. In this way, the occurrence of hot spots can reliably be prevented.

It is noted that the foregoing examples have been provided merely for the purpose of explanation and are in no way to be construed as limiting of the present invention. While the present invention has been described with reference to certain embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

What is claimed:

1. A roll, adapted for use in smoothing paper webs, comprising:
    a hard roll core; and
    a resilient covering layer comprising an outer functional layer and an inner connecting layer that connects the functional layer to the roll core,
    wherein the inner connecting layer comprises a matrix material with embedded fiber layers being positioned radially one over the other, and
    wherein the fiber layers each comprise fibers wound at a predetermined angle to the longitudinal axis of the roll core and extending essentially parallel to one another and, for different fiber layers, the predetermined angle of the fiber layers with respect to the longitudinal axis of the roll core is different.

2. The roll according to claim 1, wherein the predetermined angle of the fiber layer increases as distance from the roll core increases.

3. The roll according to claim 1, wherein the matrix material is a polymer.

4. The roll according to claim 3, wherein the polymer is one of a thermosetting polymer or a thermoplastic polymer.

5. The roll according to claim 1, wherein the matrix material comprises a resin/hardener combination.

6. The roll according to claim 1, wherein fiber bundles of two immediately successive fiber layers extend in opposite directions, such that orientations of the fiber bundles of two immediately successive fiber layers are symmetrical with respect to the cross-sectional area of the roll.

7. The roll according to claim 1, wherein the predetermined angle, with respect to the longitudinal axis of the roll of the individual fiber layers increases radially outwardly.

8. The roll according to claim 1, wherein the predetermined angle of the inner fiber layers is between about 30° and 40°.

9. The roll according to claim 1, wherein the predetermined angle increases in steps of about 10° to 20° radially outwardly.

10. The roll according to claim 9, wherein the predetermined angle increases in steps of about 15°.

11. The roll according to claim 6, wherein the fiber bundles comprise fiber rovings, a roving comprising a number of fibers of identical type lying beside one another.

12. The roll according to claim 1, wherein the fibers are at least one of glass and carbon fibers.

13. The roll according to claim 12, the mixture ratio of glass fibers to carbon fibers being between about 60/40 and about 90/10.

14. The roll according to claim 12, wherein the mixture ratio of glass fibers to carbon fibers is about 70/30.

15. The roll according to claim 1, wherein the fiber content of the connecting layer is between 50 and 60% by volume.

16. The roll according to claim 1, wherein at least one of the inner connecting layer and the outer functional layer comprises a mixture of glass fibers and carbon fibers, which are embedded in a matrix material and are distributed essentially uniformly over the length of the roll.

17. The roll according to claim 1, wherein the fiber content of the connecting layer is about 55% by volume.

18. The roll according to claim 1, wherein the fiber content of the connecting layer is between about 40 and 70% by volume.

19. The roll according to claim 1, wherein the fiber content of the functional layer is between about 8 and 12% by volume.

20. The roll according to claim 1, wherein the fiber content of the functional layer is between about 5 and 20% by volume.

* * * * *